April 29, 1930.  L. S. PFOUTS  1,756,261

FREEZING APPARATUS

Filed Aug. 15, 1927    2 Sheets-Sheet 1

Inventor.
Leroy S. Pfouts
By Geo. A. Pitts
    Attorney

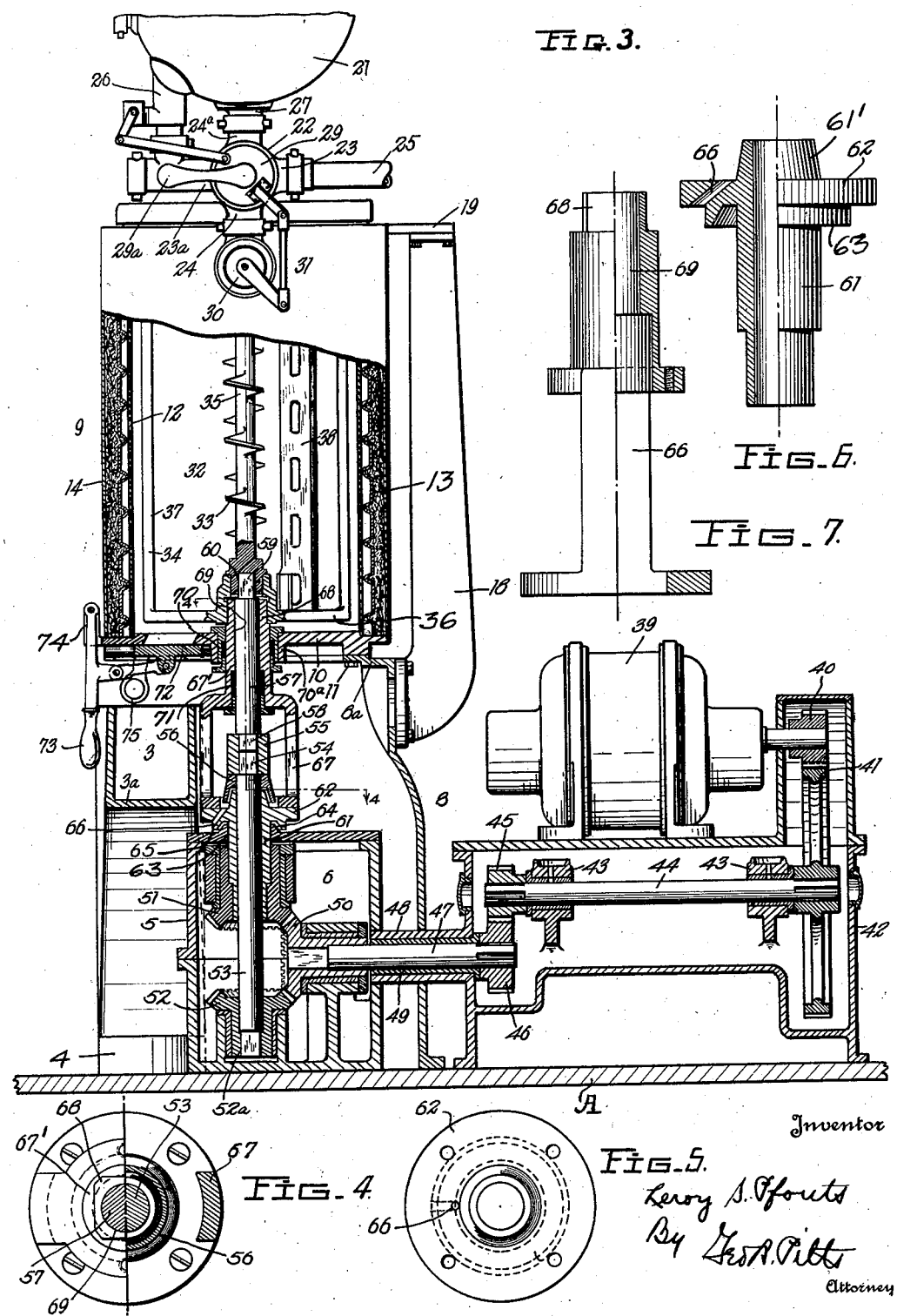

Patented Apr. 29, 1930

1,756,261

UNITED STATES PATENT OFFICE

LEROY S. PFOUTS, OF CANTON, OHIO, ASSIGNOR TO THE H. H. MILLER INDUSTRIES COMPANY, OF CANTON, OHIO, A CORPORATION OF OHIO

FREEZING APPARATUS

Application filed August 15, 1927. Serial No. 212,977.

This invention relates to apparatus for freezing materials such as ice cream, sherbets, ices and the like.

One object of the invention is to provide a plurality of freezers and a discharge hopper therefor so related that the materials from all of the freezers may quickly be discharged therein to effect an immediate mixing of the materials into one mass or batch to insure uniformity in the finished product.

Another object of the invention is to provide, in an upright freezing mechanism, an improved driving means construction to prevent leakage of liquid from the freezer into or upon the driving elements or flow of lubricant upwardly into the freezing cylinder.

Other objects of the invention will be apparent to those skilled in the art to which my invention relates from the following description taken in connection with the accompanying drawings, wherein—

Fig. 3 is a side view, partly in section on the line 3—3 of Fig. 1.

Fig. 4 is a section on the line 4—4 of Fig. 3.

Fig. 5 is a plan view of one of the driving elements.

Fig. 6 is a view of the element shown in Fig. 5, partly in elevation and partly in section.

Fig. 7 is a view of another driving element, partly in elevation and partly in section.

Figure 1:
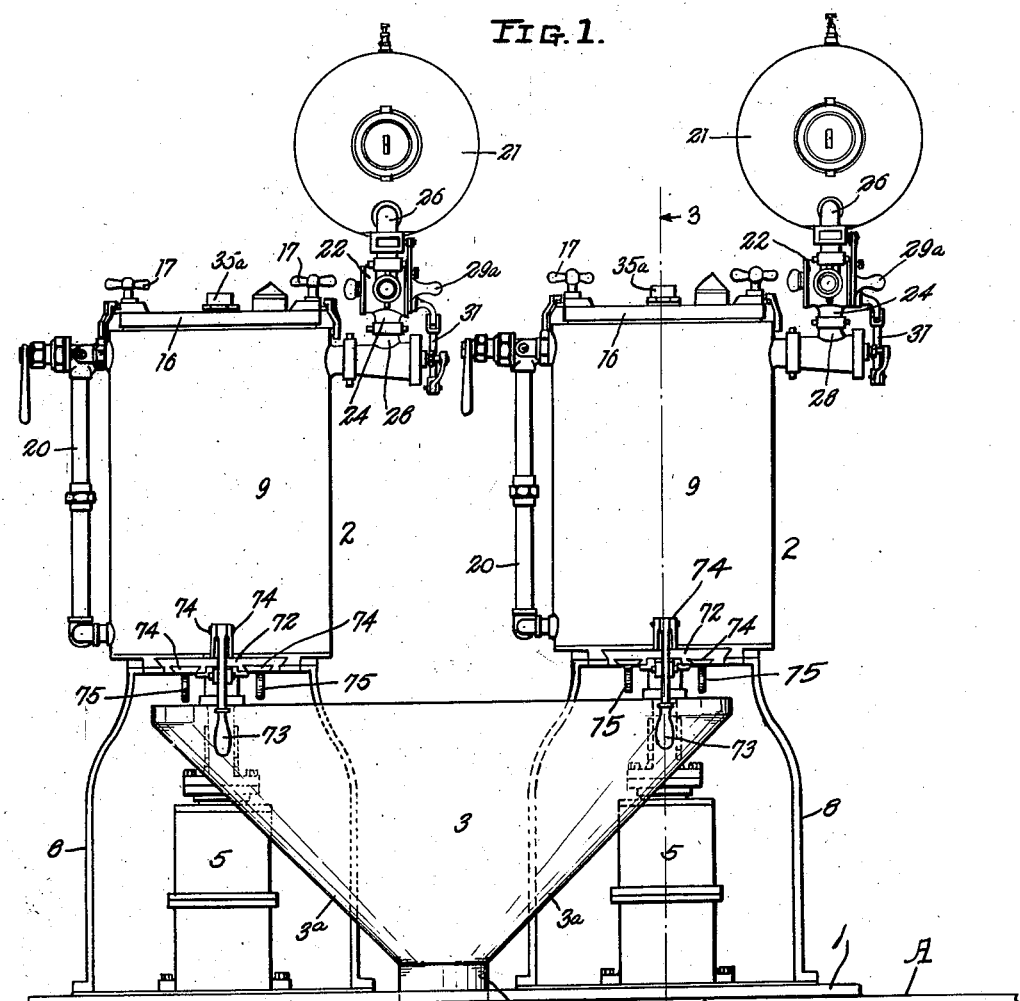
Fig. 1 is a front view of a plurality of freezing mechanisms and a receiving hopper in related position thereto embodying my invention.

In the drawings, A is a flooring. 1 indicates a base for one or more freezing machines 2, 2. When the base is omitted the machines rest on the floor A. I have shown two freezing machines in side by side relation. 3 indicates a hopper having its lower end connected with a chute or down spout 4 which leads to a lower floor where the frozen material is packed in cans and the latter stored for hardening. The hopper 3 is preferably elongated so that it may be readily disposed in position to receive the frozen material and in front of casings 5 for the driving means. 6, where the machines are of the upright type and without occupying undue space in front of them.

Figure 2:
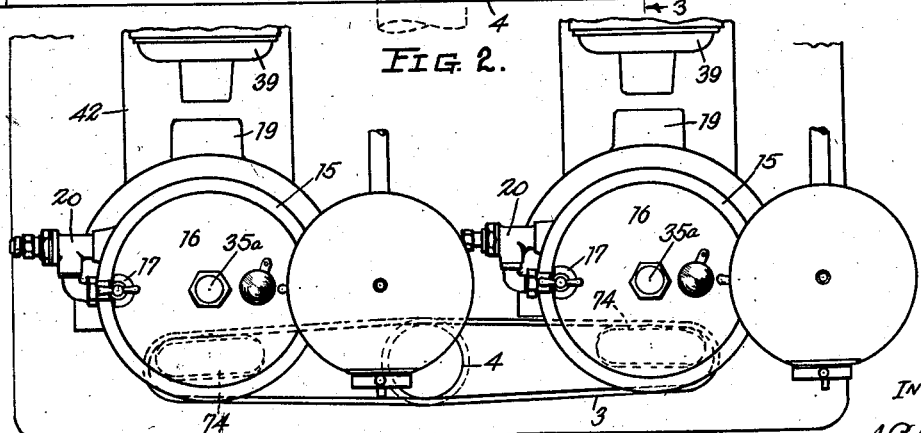
Fig. 2 is a plan view of the parts shown in Fig. 1 with portions broken away.

The open end of the hopper is common to the two freezing machines to receive the frozen material from either or both simultaneously. It is well known that the character of the frozen material varies since one batch may be frozen harder or have a greater swell than another batch, and this variance and non-uniformity produces in the minds of consumers the impression that the frozen material differs in quality. As a means of minimizing these varying conditions and to insure greater uniformity, I have arranged a plurality of freezing machines and a hopper in such relation that in discharging the frozen materials from the machines the material from one machine is caused to mix or intermingle with that from the other machine so that if one batch varies with respect to its swell or hardness it will be equalized by the other batch, in order that the mixed mass will be substantially of the character intended and as a result all of the mixed masses will be more uniform. By arranging the two machines so that the material discharged therefrom will be guided directly downwardly into a single chute I am enabled to mix the materials from both machines into a single mass for packing. As shown, the opposite ends of the hopper 3 are below valve openings (see Figs. 2 and 3) and the bottoms $3^a$ of the hopper are inclined downwardly from its opposite ends to the chute 4. In this arrangement the material flowing down one bottom $3^a$ is directed into or upon the material flowing down the other bottom to insure their mixing as they enter the chute 4.

8 indicates a support suitably secured to the base 1, preferably one support for each freezing machine. Each support may consist of a hollow or chambered casting 5 for the driving means so as to partially enclose the casing 6 and also rigidly support the adjacent freezer 9 in overhanging relation to the hopper 3. The upper end of the support is provided with a flange $8^a$ to which the bottom 10 of the freezer 9 is secured by cap screws 11. Each freezer 9 preferably comprises an inner cylinder 12, a cylinder 13 surrounding the cylinder 12 and corrugated to form a circuitous conduit for a refrigerant and an outer cylinder 14 forming a suitable jacket, the space between the cylinders 13, 14, being filled with insulation, such as cork or hair. The ends of the cylinder are suitably secured to the bottom 10 and a ring 15. The ring 15 is formed with a seat which is removably engaged by a top 16, the latter being rigidly secured in position by clamping devices 17. 18 indicates a standard secured at its lower end to the support 8 and at its upper end secured to a bracket 19 preferably formed integrally with and extending laterally from the ring 15. The standard 18 serves to steady and brace the freezer 9 in rigid upright position. 20 indicates the supply and discharge pipes for the refrigerant, such as brine, each leading through the jacket and insulation for connection with one end of the circuitous conduit.

21 indicates a tank for measuring the material to be frozen before it is discharged into the cylinder. 22 indicates a valve casing having four nipples 23, 23$^a$, 24, 24$^a$. 25 indicates a material supply pipe connected by a union with the nipple 23. The nipple 23$^a$ is extended and preferably is provided with a branch to which is connected an inlet pipe 26 leading into the bottom of the tank 21. The nipple 24$^a$ is connected by a pipe 27 with the bottom of the tank 21 to permit discharge of the material therefrom. The nipple 24 is connected with a pipe 28 which leads into and through the side wall of the cylinder 9 and discharges into the cylinder 12. 29 indicates a valve rotatably mounted in the casing 22. The valve 29 has a port extending diametrically through it and when in one position this port registers with the nipples 23, 23$^a$, and cuts off the nipples 24, 24$^a$, so that the material may flow from the supply pipe 25 past the valve and through the pipe 26 into the tank 21 until the latter is filled, or until certain devices (not shown) within the tank prevent filling beyond a certain limit. When the valve 29 is rotated a quarter turn, its port registers with the nipples 24, 24$^a$, and thus permits the material to flow into the cylinder 12.

30 indicates a valve mounted in the pipe 28, portions of the valve extending through to a point adjacent the discharge end of the pipe and serving to cut away any material frozen in the pipe. This valve and the portions carried by it are preferably similar in construction to like parts shown in my Patent No. 1,191,222, dated July 18, 1916, to which reference may be made. 31 indicates a linkage between the valve 29 and valve 30, so that when one is operated its movement is transmitted to the other valve. In the disclosed construction the valve 29 is provided with an operating handle 29$^a$.

32 indicates an agitating and scraping mechanism comprising an inner member 33 and an outer member 34, these members being rotated in opposite directions by the driving means 6, as will later appear. The inner member 33 comprises a shaft 35 mounted in a bearing formed within a cap 35$^a$ carried by the top 16 and a plurality of elements which preferably tend to lift the material upwardly. The outer member comprises upper and lower spiders 36 rotatable on the shaft 35 and carrying one or more whipping bars 37 and one or more scrapers 38.

39 indicates a power device, such as an electric motor, its shaft carrying a pinion 40 in mesh with a gear 41. The pinion 40 and gear 41 are mounted in a casing 42, so arranged that a portion of its top supports the motor 39. The casing 42 is provided with bearings 43 for a shaft 44 to one end of which the gear 41 is secured. The opposite end of shaft 44 carries a pinion 45 in mesh with a gear 46 splined to a countershaft 47. In the form of construction just described, it will be noted that I provided for two gear reductions between the power shaft and countershaft 47. The inner side wall of the casing 42 has a neck 48 which extends laterally through openings formed in the support 8 and rear wall of casing 5, and within this neck is a bushing 49 forming a bearing for the shaft 47. The outer end of the shaft 47 is secured to the hub of a main gear 50 which meshes with driven gears 51, 52, to drive them in opposite directions, the hubs of the main and driven gears being suitably mounted in the casing 5. As shown in Fig. 3, the bottom of the casing 42 is chambered at points below the gears 41 and 46 to hold a suitable quantity of a lubricant.

The hub of the gear 52 is formed with an irregular shaped portion 52$^a$ into which fits the complementary end of a shaft section 53. The upper end of the shaft section has an irregular portion 54 which is fitted and secured to complementary inner walls of a collar 55. Below the collar 55 the shaft section carries an inverted cup member 56 the side walls or skirt of which incline outwardly. The purpose of the member 56 will later be set forth. 57 indicates a shaft section having an irregular portion 58 on its lower end fitted and secured to the complementary inner walls of the collar 55 and at its upper end with an irregular portion 59 detachably fitting a correspondingly shaped socket 60 in the lower end of the shaft 35.

61 indicates a sleeve shaft surrounding the shaft section 53 and fixed in any desired manner to the inner wall of the hub of gear 51. The upper portion of the sleeve shaft 61, beyond the top wall of the casing 5 is provided with an enlarged annular member 62 which carries a downwardly and outwardly inclined wall or skirt 63 fitting over and around a conical rib 64 surrounding the opening 65 for the shafts 53, 61, formed in the casting top, so that in event any liquid accumulates on the casing top, it will be diverted away from the opening 65. The upper end of the sleeve shaft 61 is of conical shape, as shown at 61' (see Fig. 6), and fits within the skirt 56 so that the latter will extend beyond and away from the upper end of the shaft 61 to prevent liquid from entering and leaking downwardly between the shafts 53 and 61. The annular member 62 is formed with a plurality of outwardly inclined ports or passages, one being shown at 66, for discharging any liquid that may accumulate on the annular member 62, so that it will not leak downwardly into the casing 5. 67 indicates a yoke having a flange suitably secured to the annular member 62 by cap screws or other devices. The upper portion of the yoke is provided with a sleeve shaft 67, surrounding the shaft section 57, its upper end being provided with an irregular shaped portion 68 fitting a correspondingly shaped socket 69 formed in the hub of the adjacent spider 36.

70 indicates a suitable gland provided in the opening 70ª formed in the bottom 10 and 71 indicates a suitable gland between the shaft section 57 and shaft 67.

By making the driving shaft for the inner agitating member 33 in sections and reducing their inner or adjacent ends and mounting the latter into a clutch element 55 as shown I am enabled to break up the downward flow, due to any leakage past the glands 70, 71, or capillary attraction and by providing below this collar or clutch element inter-related conical elements 61', 56, the upper and outer one (56) on the inner shaft and the lower and inner one (61') on the sleeve shaft, I am enabled to prevent flow of liquid along either shaft to the casing for the drive means 6. As a means of further precaution I provide a pair of similar inter-related elements 63, 64, between the sleeve shaft 61 and top wall of the casing 5 to prevent liquid from flowing through the latter wall. While these pairs of inter-related elements just referred to are primarily intended to prevent the leaking of liquid into the casing 5, they also prevent the escape of lubricant upwardly into the freezer 9. In the event such lubricant does rise along either shaft, it will be arrested by the skirts 63 and 56 and thrown outwardly by centrifugal force.

The discharge opening from the cylinder 12 is closed by a slide valve 72 mounted in suitable guides. The valve 72 is provided with a link which is connected to a handle 73. The handle is pivotally supported by two lugs 74, preferably formed integrally with the bottom 10. The valve 72 is formed with two relatively small openings at either side of a plane cutting the axis of the cylinder 9 and these openings are controlled by valves 74 each having an operating handle 75. There are two valves 74 so that the freezing machines will be interchangeable and at the same time have one valve 74 accessible in any position it may be placed. The valve 72 is preferably provided with suitable guides to slidably support the valves 74. The valve 72 is adapted for use to permit discharge of the frozen material into the hopper 3, whereas either one of the valves 74 may be used for testing the material as freezing takes place. No claim is made herein to the construction of a freezer having a discharge valve and a testing valve as that forms the subject-matter of my co-pending application Ser. No. 248,543, see Letters Patent No. 1,706,589, dated March 26, 1929.

To those skilled in the art to which my invention relates many changes in construction and widely differing embodiments and applications of the invention will suggest themselves without departing from the spirit and scope thereof. My disclosures and the descriptions herein are purely illustrative and are not intended to be in any sense limiting.

What I claim is:

1. In apparatus of the class described, the combination of an upright freezing cylinder having upper and lower heads and inner and outer rotatable members arranged to rotate in opposite directions, a driving mechanism below said freezing cylinder, concentrically arranged shafts connected with elements of said driving mechanism and said rotatable members, respectively, and inter-related elements carried by said shafts below said lower head and arranged to prevent flow of liquid escaping from said cylinder downwardly onto said driving mechanism.

2. In apparatus of the class described, the combination of an upright freezing cylinder having upper and lower heads and inner and outer rotatable members arranged to rotate in opposite directions, a driving mechanism below said freezing cylinder, concentrically arranged shafts connected with elements of said driving mechanism and said rotatable members, respectively, and inter-related elements carried by said shafts below said lower head and arranged to prevent flow of liquid escaping from said cylinder downwardly onto said driving mechanism, one of said elements comprising an upwardly extended annular portion and the other element being carried by one of said shafts and extending downwardly beyond the upper edge of said annular portion and surrounding the same.

3. In apparatus of the class described, the combination of an upright freezing cylinder having upper and lower heads and inner and outer rotatable members arranged to rotate in opposite directions, a driving mechanism, below said freezing cylinder, concentrically arranged shafts connected with elements of said driving mechanism and said rotatable members, respectively, and inter-related elements carried by said shafts below said lower head and arranged to prevent flow of liquid escaping from said cylinder downwardly onto said driving mechanism, one of said elements comprising an upwardly extending portion carried by the outer shaft and the other element comprising a downwardly extending skirt surrounding said portion and carried by the inner shaft.

4. In apparatus of the class described, the combination of an upright freezing cylinder having upper and lower heads and inner and outer rotatable members arranged to rotate in opposite directions, a driving mechanism below said freezing cylinder, concentrically arranged shafts connected with elements of said driving mechanism and said rotatable members, respectively, and pairs of inter-related elements disposed longitudinally of said shafts below said lower head and arranged to prevent leakage of liquid escaping from said cylinder downwardly, each pair of elements comprising an upwardly extending annular portion and an annular skirt surrounding and extending downwardly below the upper edge of said portion.

5. In apparatus of the class described, the combination of an upright material holding cylinder having inner and outer members arranged to be rotated in opposite directions, a casing below said cylinder, a driving mechanism within said casing, concentrically arranged shafts connected with elements of said driving mechanism and extending upwardly through said casing and connected to said members, respectively, the outer shaft being provided above said casing with an annular base, formed with a passage leading therethrough, and an upwardly extended annular portion, and a skirt secured to said shaft above said base and extending downwardly below the upper edge of said annular portion for directing liquid escaping from said cylinder onto said base.

6. In apparatus of the class described, the combination of an upright material holding cylinder having inner and outer members arranged to be rotated in opposite directions, a casing below said cylinder, a driving mechanism within said casing, concentrically arranged shafts connected with elements of said driving mechanism and extending upwardly through said casing and connected to said members, respectively, an annular member carried by the top wall of said casing surrounding the opening therein for said shafts, the outer shaft being provided above said casing with an annular base and an upwardly extended annular portion on its upper surface and a depending skirt on its lower surface surrounding said annular member and extending below its upper surface, and a skirt secured to the other shaft above said base and extending downwardly below the upper edge of said annular portion.

7. In apparatus of the class described, the combination of a hopper having a chute and inclined walls leading thereto, and a plurality of stationary freezing cylinders mounted above said hopper and having in their lower portions valved controlled discharge openings arranged to discharge material into said hopper, whereby discharge may be effected simultaneously into said hopper to cause a mixing of the materials discharged from said cylinders as the materials flow into said chute.

8. In apparatus of the class described, the combination of an elongated hopper having inclined end walls and a chute at its lower end, and a plurality of stationary freezing cylinders mounted above said hopper and having in their lower portions valved controlled discharge openings arranged to discharge material into said hopper, whereby discharge may be effected simultaneously into said hopper, said hopper being elongated in a plane parallel to a line cutting the axes of said cylinders, the inclined walls serving to direct the materials discharged from said cylinders into said chute to effect mixing thereof.

In testimony whereof, I have hereunto subscribed my name.

LEROY S. PFOUTS.